US009336608B2

(12) United States Patent
Tanikawa

(10) Patent No.: US 9,336,608 B2
(45) Date of Patent: May 10, 2016

(54) COLOR ARRANGEMENT CHECKING DEVICE, INFORMATION STORAGE MEDIUM STORING A COMPUTER PROGRAM THEREOF, AND DATA PROCESSING METHOD

(75) Inventor: Yukiko Tanikawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 719 days.

(21) Appl. No.: 13/639,783

(22) PCT Filed: Apr. 6, 2011

(86) PCT No.: PCT/JP2011/002038
§ 371 (c)(1),
(2), (4) Date: Oct. 5, 2012

(87) PCT Pub. No.: WO2011/145257
PCT Pub. Date: Nov. 24, 2011

(65) Prior Publication Data
US 2013/0021365 A1 Jan. 24, 2013

(30) Foreign Application Priority Data
May 20, 2010 (JP) ................................. 2010-115923

(51) Int. Cl.
*G06T 7/40* (2006.01)
*G06F 17/21* (2006.01)
(Continued)

(52) U.S. Cl.
CPC .............. *G06T 7/408* (2013.01); *G06F 17/211* (2013.01); *G06K 9/00463* (2013.01);
(Continued)

(58) Field of Classification Search
None
See application file for complete search history.

(56) References Cited

U.S. PATENT DOCUMENTS 7,890,089 B1 * 2/2011 Fujisaki ................... 455/414.2
2005/0028074 A1 2/2005 Harrington et al.
(Continued)

FOREIGN PATENT DOCUMENTS

JP 8-249441 A 9/1996
JP 2903604 B2 6/1999
(Continued)

OTHER PUBLICATIONS

Sato, Takami et al., Multimedia Authoring system "MediaDesc"(4), Proceedings of the 52nd (1996, preceding term) National Convention (3), Information Processing Society of Japan, Mar. 1996, pp. 3-241-3-242 (3 pages total).

(Continued)

*Primary Examiner* — Joni Richer
(74) *Attorney, Agent, or Firm* — Sughrue Mion, PLLC

(57) ABSTRACT

A color arrangement checking device stores a full-color document in which elements of each color are placed on a page, detects at least a color and a size of the elements for each page of the document, adds up the size of the elements for the whole page by the color which is output as an occupancy ratio, and determines whether or not at least one of brightness and saturation exceeds a predetermined color threshold value for each color of the elements. The color arrangement checking device determines whether or not the occupancy ratio by the color of the elements, which assume the color, of which at least one of the brightness and the saturation is determined to exceed the color threshold value, as an attribute, exceeds a predetermined occupancy threshold value, and outputs the elements which assume the color, of which the occupancy ratio is determined to exceed the occupancy threshold value, as the attribute.

6 Claims, 14 Drawing Sheets

(51) Int. Cl.
  *G06K 9/00* (2006.01)
  *H04N 1/00* (2006.01)
(52) U.S. Cl.
  CPC ...... *H04N 1/00002* (2013.01); *H04N 1/00005* (2013.01); *G06T 2207/10024* (2013.01); *G06T 2207/30176* (2013.01)

(56) References Cited

U.S. PATENT DOCUMENTS

| | | | |
|---|---|---|---|
| 2005/0160369 A1* | 7/2005 | Balabanovic et al. | 715/766 |
| 2010/0165137 A1* | 7/2010 | Koishi | G02B 1/365 348/222 |
| 2010/0194747 A1* | 8/2010 | Bronder et al. | 345/422 |

FOREIGN PATENT DOCUMENTS

| | | |
|---|---|---|
| JP | 11-328377 A | 11/1999 |
| JP | 2002-197403 A | 7/2002 |
| JP | 2005-50351 A | 2/2005 |
| JP | 2006-262050 A | 9/2006 |
| JP | 2008-146227 A | 6/2008 |
| JP | 2008-257565 A | 10/2008 |

OTHER PUBLICATIONS

"aDesigner", IBM, 2 pages; Feb. 17, 2010.
"ColorSelector 5.1", Fujitsu, 3 pages; Feb. 17, 2010.
Communication dated Feb. 17, 2015, issued by the Japan Patent Office in corresponding Japanese Application No. 2012-515711.

* cited by examiner

FIG. 10

| ELEMENT ID | ELEMENT TYPE | CHARACTER COLOR | | BACKGROUND COLOR | | POSITION | | SIZE | | AREA |
|---|---|---|---|---|---|---|---|---|---|---|
| | | (R,G,B) | (H,S,V) | (R,G,B) | (H,S,V) | top(px) | left(px) | height(px) | width(px) | |
| CP01 | Body | (0,0,0) | (0,0,0) | (255,255,255) | (0,0,100) | 0 | 0 | 770 | 870 | 669900 |
| CP02 | LEVEL 1 HEADING | (255,255,255) | (0,0,100) | (0,102,51) | (150,100,40) | 30 | 30 | 50 | 820 | 41000 |
| CP03 | GROUP 1 | (0,0,0) | (0,0,0) | (222,226,224) | (150,1,88) | 30 | 30 | 270 | 820 | 22140 |
| CP04 | ITEM HEADING a | (0,0,0) | (0,0,0) | (102,255,51) | (106,80,100) | 110 | 50 | 40 | 320 | 12800 |
| CP05 | INPUT BOX a | (0,0,0) | (0,0,0) | (255,255,255) | (0,0,100) | 110 | 370 | 40 | 440 | 17600 |
| CP06 | ITEM HEADING a | (0,0,0) | (0,0,0) | (102,255,51) | (106,80,100) | 165 | 50 | 40 | 320 | 12800 |
| CP07 | INPUT BOX a | (0,0,0) | (0,0,0) | (255,255,255) | (0,0,100) | 165 | 370 | 40 | 440 | 17600 |
| CP08 | ITEM HEADING a | (0,0,0) | (0,0,0) | (102,255,51) | (106,80,100) | 220 | 50 | 60 | 320 | 19200 |
| CP09 | INPUT BOX a | (0,0,0) | (0,0,0) | (255,255,255) | (0,0,100) | 220 | 370 | 60 | 440 | 26400 |
| CP10 | LEVEL 1 HEADING | (255,255,255) | (0,0,100) | (0,102,51) | (150,100,40) | 330 | 30 | 50 | 820 | 41000 |
| CP11 | GROUP 1 | (0,0,0) | (0,0,0) | (222,226,224) | (150,1,88) | 330 | 30 | 390 | 820 | 319800 |
| CP12 | ITEM HEADING b | (0,0,0) | (0,0,0) | (102,255,51) | (106,80,100) | 400 | 50 | 40 | 320 | 12800 |
| CP13 | INPUT BOX b | (0,0,0) | (0,0,0) | (255,255,255) | (0,0,100) | 400 | 370 | 40 | 235 | 9400 |
| CP14 | ITEM HEADING b | (0,0,0) | (0,0,0) | (102,255,51) | (106,80,100) | 455 | 50 | 40 | 320 | 12800 |
| CP15 | INPUT BOX b | (0,0,0) | (0,0,0) | (255,255,255) | (0,0,100) | 455 | 370 | 40 | 235 | 9400 |
| CP16 | ITEM HEADING b | (0,0,0) | (0,0,0) | (102,255,51) | (106,80,100) | 510 | 50 | 40 | 320 | 12800 |
| CP17 | INPUT BOX b | (0,0,0) | (0,0,0) | (255,255,255) | (0,0,100) | 510 | 370 | 40 | 235 | 9400 |
| CP18 | ITEM HEADING b | (0,0,0) | (0,0,0) | (102,255,51) | (106,80,100) | 565 | 50 | 40 | 320 | 12800 |
| CP19 | INPUT BOX b | (0,0,0) | (0,0,0) | (255,255,255) | (0,0,100) | 565 | 370 | 40 | 235 | 9400 |
| CP20 | ITEM HEADING b | (0,0,0) | (0,0,0) | (102,255,51) | (106,80,100) | 620 | 50 | 60 | 320 | 19200 |
| CP21 | INPUT BOX c | (0,0,0) | (0,0,0) | (255,255,255) | (0,0,100) | 620 | 370 | 60 | 440 | 26400 |
| CP22 | ITEM HEADING b | (0,0,0) | (0,0,0) | (102,255,51) | (106,80,100) | 695 | 50 | 40 | 320 | 12800 |
| CP23 | INPUT BOX c | (0,0,0) | (0,0,0) | (255,255,255) | (0,0,100) | 695 | 370 | 40 | 440 | 17600 |

FIG. 11

| ELEMENT ID | SUPERIMPOSING ELEMENT EXISTENCE=1 NONEXISTENCE=0 | ELEMENT RIGHT ABOVE |
|---|---|---|
| CP01 | 1 | CP03, CP11 |
| CP02 | 0 | — |
| CP03 | 1 | CP02, CP04, CP05, CP06, CP07, CP08, CP09 |
| CP04 | 0 | — |
| CP05 | 0 | — |
| CP06 | 0 | — |
| CP07 | 0 | — |
| CP08 | 0 | — |
| CP09 | 0 | — |
| CP10 | 0 | — |
| CP11 | 1 | CP10, CP12, CP13, CP14, CP15, CP16, CP17, CP18, CP19, CP20, CP21, CP22, CP23 |
| CP12 | 0 | — |
| CP13 | 0 | — |
| CP14 | 0 | — |
| CP15 | 0 | — |
| CP16 | 0 | — |
| CP17 | 0 | — |
| CP18 | 0 | — |
| CP19 | 0 | — |
| CP20 | 0 | — |
| CP21 | 0 | — |
| CP22 | 0 | — |
| CP23 | 0 | — |

FIG. 12

| ELEMENT ID | ELEMENT TYPE | AREA | DISPLAY AREA |
|---|---|---|---|
| CP01 | Body | 669900 | 128700 |
| CP02 | LEVEL 1 HEADING | 41000 | 41000 |
| CP03 | GROUP 1 | 221400 | 74000 |
| CP04 | ITEM HEADING a | 12800 | 12800 |
| CP05 | INPUT BOX a | 17600 | 17600 |
| CP06 | ITEM HEADING a | 12800 | 12800 |
| CP07 | INPUT BOX a | 17600 | 17600 |
| CP08 | ITEM HEADING a | 19200 | 19200 |
| CP09 | INPUT BOX a | 26400 | 26400 |
| CP10 | LEVEL 1 HEADING | 41000 | 41000 |
| CP11 | GROUP 1 | 319800 | 114000 |
| CP12 | ITEM HEADING b | 12800 | 12800 |
| CP13 | INPUT BOX b | 9400 | 9400 |
| CP14 | ITEM HEADING b | 12800 | 12800 |
| CP15 | INPUT BOX b | 9400 | 9400 |
| CP16 | ITEM HEADING b | 12800 | 12800 |
| CP17 | INPUT BOX b | 9400 | 9400 |
| CP18 | ITEM HEADING b | 12800 | 12800 |
| CP19 | INPUT BOX b | 9400 | 9400 |
| CP20 | ITEM HEADING b | 19200 | 19200 |
| CP21 | INPUT BOX c | 26400 | 26400 |
| CP22 | ITEM HEADING b | 12800 | 12800 |
| CP23 | INPUT BOX c | 17600 | 17600 |

FIG. 13

| BACKGROUND COLOR ||
|---|---|
| (R, G, B) | (H, S, V) |
| (255, 255, 255) | (0, 0, 100) |
| (102, 255, 51) | (105, 80, 100) |
| (222, 226, 224) | (150, 1, 88) |
| (0, 102, 51) | (150, 100, 40) |

FIG. 14

| BACKGROUND COLOR | | DISPLAY AREA | OCCUPANCY RATIO % |
|---|---|---|---|
| (R, G, B) | (H, S, V) | | |
| (255, 255, 255) | (0, 0, 100) | 271900 | 41% |
| (102, 255, 51) | (105, 80, 100) | 128000 | 19% |
| (222, 226, 224) | (150, 1, 88) | 188000 | 28% |
| (0, 102, 51) | (150, 100, 40) | 82000 | 12% |

COLOR ARRANGEMENT CHECKING DEVICE, INFORMATION STORAGE MEDIUM STORING A COMPUTER PROGRAM THEREOF, AND DATA PROCESSING METHOD

CROSS REFERENCE TO RELATED APPLICATIONS

This application is a National Stage of International Application No. PCT/JP2011/002038, filed on Apr. 6, 2011, which claims priority from Japanese Patent Application No. 2010-115923, filed on May 20, 2010, the contents of all of which are incorporated herein by reference in their entirety.

TECHNICAL FIELD

The present invention relates to a color arrangement checking device that checks a color arrangement of a full-color document in which elements of each color are placed on a page, a computer program thereof, and a data processing method.

BACKGROUND ART

In a method and a device for checking a color arrangement of a document that is displayed on a display screen of a computer device, such as web content or the like, there is a method that exemplifies an appropriate color arrangement through analysis of the color arrangement of the document from the viewpoint of readability (ease of reading) (Patent Document 1 and Non-Patent Documents 1 and 2).

In the technology of Patent Document 1, a difference in color index (brightness, hue, and saturation) between elements having adjacent layers is calculated through analysis of the structure of elements included in a document, and if the difference is not larger than a predetermined threshold value, it is determined that the document lacks readability.

On the other hand, there is a method that exemplifies an appropriate color arrangement through analysis of the harmony (beauty and comfort) of the color arrangement between elements included in a document (Patent Documents 2 and 3). In the technology of Patent Document 2, it is calculated by a calculation algorithm whether or not the color arrangement set by a user fit the sensitivity conditions previously appointed by the user (prescribing of the visual state to be expressed through the whole document or a general atmosphere) with respect to display colors of the elements displayed on a screen, and a user is notified of the result of the calculation.

A device that displays a document or the like as an image may have a method to remove eye fatigue (Patent Document 4). In the technology of Patent Document 4, eye fatigue is removed by automatically harmonizing the luminance of an image with the luminance of a neighboring area of the image when the image that is displayed through a projector or the like is displayed.

There has been proposed a wiring design device which can easily place through-holes during the wiring design of a printed circuit board having a plurality of layers or semiconductor parts. If it is determined that position information has been acquired, the wiring design device opens a new window that is different from the window that was targeted for work before starting via placement processing, and displays wiring layers that belong to a multilayer printed circuit board and attributes of the wiring layers, in association with each other, on the opened window using acquired layer attributes.

In the newly opened window, the wiring layers that belong to the multilayer printed circuit board and the attributes of the wiring layers are displayed in association with each other. In the window, a user selects the wiring layer on which vias are placed by a drag operation using a mouse. In order to place the vias from a first wiring layer to a sixth wiring layer, the user designates an area through performing a drag operation from point A to point B using the mouse (Patent Document 5).

There has been proposed a document analysis device that can analyze that contrast of the hue has been made in a document. In this technology, a plurality of images are extracted from the document, and the image having the maximum display area, the image having the second largest display area, and the image having the third largest display area are selected from the extracted images.

It is detected whether or not the ratio in size between the display areas of the second largest image and the third largest image is equal to or larger than a predetermined first threshold value, and if it is detected that the ratio in size between the display areas is equal to or larger than the first threshold value, a difference in color information between the maximum image and the second largest image is detected based on the result of the detection. If it is detected that the difference in color information is equal to or larger than the second threshold value, it is analyzed that the contrast of the hue has been made in the document (Patent Document 6).

RELATED DOCUMENTS

Patent Documents

[Patent Document 1] Japanese Unexamined Patent Application Publication No. 2002-197403
[Patent Document 2] Japanese Unexamined Patent Application Publication No. H08-249441
[Patent Document 3] Japanese Unexamined Patent Application Publication No. 2008-146227
[Patent Document 4] Japanese Patent No. 2903604
[Patent Document 5] Japanese Unexamined Patent Application Publication No. 2008-257565
[Patent Document 6] Japanese Unexamined Patent Application Publication No. H11-328377

Non-Patent Document

[Non-Patent Document 1] "aDesigner", IBM
[Non-Patent Document 2] "ColorSelector", FUJITSU

DISCLOSURE OF THE INVENTION

In the document, even if the readability is highly harmonized, there is an unfavorable color arrangement that lead to a user feeling fatigue or an unpleasant sensation.

In contrast, if the display device in the related art (Patent Document 4) having the method to remove eye fatigue is used, it is possible to reduce eye fatigue at a step of displaying a document as an image through a projector or the like.

However, this removes eye fatigue by automatically harmonizing the luminance of the image with the luminance of the neighboring area of the image. That is, this does not solve the problems of the color arrangement of the document itself. Because of this, the user of the document except for the above-described display device is unable to avoid eye fatigue.

The present invention has been made in consideration of the above-described problems, and an object of the present invention is to provide a color arrangement checking device that can simply and reliably find problems of a color arrangement which causes fatigue or an unpleasant sensation to the user, a computer program thereof, and a data processing method.

According to the present invention, a color arrangement checking device includes: a document storage unit storing a full-color document in which elements of each color are placed on a page; an attribute detection unit detecting at least a color and a size of the elements for each page of the document; an occupancy ratio calculation unit adding up the size of the elements for the whole page by the color and outputting this as an occupancy ratio; a color arrangement checking unit determining whether or not at least one of brightness and saturation exceeds a predetermined color threshold value for each color of the elements; an occupancy ratio checking unit determining whether or not the occupancy ratio by the color of the elements, which assume the color, of which at least one of the brightness and the saturation is determined to exceed the color threshold value, as an attribute, exceeds a predetermined occupancy threshold value; and a result output unit outputting the elements which assume the color, of which the occupancy ratio is determined to exceed the occupancy threshold value, as the attribute.

According to the present invention, a computer program causes the color arrangement checking device according to the present invention to execute: a document storage process of storing a full-color document in which elements of each color are placed on a page; an attribute detection process of detecting at least a color and a size of the elements for each page of the document; an occupancy ratio calculation process of adding up the size of the elements for the whole page by the color and outputting this as an occupancy ratio; a color arrangement checking process of determining whether or not at least one of brightness and saturation exceeds a predetermined color threshold value for each color of the elements; an occupancy ratio checking process of determining whether or not the occupancy ratio by the color of the elements, which assume the color, of which at least one of the brightness and the saturation is determined to exceed the color threshold value, as an attribute, exceeds a predetermined occupancy threshold value; and a result output process of outputting the elements which assume the color, of which the occupancy ratio is determined to exceed the occupancy threshold value, as the attribute.

According to the present invention, a data processing method of the color arrangement checking device according to the present invention includes: a document storage operation of storing a full-color document in which elements of each color are placed on a page; an attribute detection operation of detecting at least a color and a size of the elements for each page of the document; an occupancy ratio calculation operation of adding up the size of the elements for the whole page by the color and outputting this as an occupancy ratio; a color arrangement checking operation of determining whether or not at least one of brightness and saturation exceeds a predetermined color threshold value for each color of the elements; an occupancy ratio checking operation of determining whether or not the occupancy ratio by the color of the elements, which assume the color, of which at least one of the brightness and the saturation is determined to exceed the color threshold value, as an attribute, exceeds a predetermined occupancy threshold value; and a result output operation of outputting the elements which assume the color, of which the occupancy ratio is determined to exceed the occupancy threshold value, as the attribute.

Various elements according to the present invention may be formed to realize their functions. For example, the elements may be realized by dedicated hardware that performs a predetermined function, a data processing device given by a computer program having a predetermined function, a predetermined function realized for a data processing device by a computer program, and their combination.

Various elements according to the present invention do not necessarily have to be independent of each other, but may be a plurality of elements being formed as one member, one element being formed by a plurality of members, a certain element that is a part of other elements, a part of a certain element that overlaps a part of other elements, and the like.

Accordingly to the computer program and the data processing method according to the present invention, a plurality of processes and operations are described in order. However, the described order does not limit the order of executing a plurality of processes and operations.

Because of this, in the case of performing the computer program and the data processing method according to the present invention, the order of the plurality of processes and operations may be changed as far as such change does not substantially cause a problem.

According to the computer program and the data processing method according to the present invention, the performing of the plurality of processes and operations is not limited to the performing of the processes and operations at different timings. Because of this, another process or operation may occur during the execution of a certain process or operation, or an execution timing of a certain process or operation and an execution timing of another process or operation may partially or entirely overlap each other.

The color arrangement checking device according to the present invention may be performed by hardware configured by general purpose devices, such as a Central Processing Unit (CPU), a Read Only Memory (ROM), a Random Access Memory (RAM), an Interface (I/F) unit, and the like, a dedicated logic circuit configured to execute a predetermined processing operation, or a combination thereof, so as to read a computer program and to perform a corresponding processing operation.

According to the color arrangement checking device, the document storage unit stores a full-color document in which elements of each color are placed on a page, the attribute detection unit detects at least a color and a size of the elements for each page of the document, the occupancy ratio calculation unit adds up the size of the elements for the whole page by the color to output as an occupancy ratio, and the color arrangement checking unit determines whether or not at least one of brightness and saturation exceeds a predetermined color threshold value for each color of the elements. The occupancy ratio checking unit determines whether or not the occupancy ratio for the color of the element, which assumes the color, of which at least one of the brightness and the saturation is determined to exceed the color threshold value, as an attribute, exceeds a predetermined occupancy threshold value, and the result output unit outputs the element which assumes the color, of which the occupancy ratio is determined to exceed the occupancy threshold value, as the attribute. Accordingly, the color arrangement checking device can simply and reliably find problems of a color arrangement that causes the user fatigue or an unpleasant sensation.

BRIEF DESCRIPTION OF THE DRAWINGS

The above and other objects, features and advantages of the present invention will be more apparent from the following preferred embodiments taken in conjunction with the accompanying drawings, in which:

FIG. 10 is a schematic diagram illustrating a data structure of attribute information of elements.

FIG. 11 is a schematic diagram illustrating a data structure of superimposition information of elements.

FIG. 12 is a schematic diagram illustrating a data structure of a display area of elements.

FIG. 13 is a schematic diagram illustrating a data structure of background colors in a page.

FIG. 14 is a schematic diagram illustrating a data structure of an occupancy ratio in a page of background colors.

DESCRIPTION OF EMBODIMENTS

Hereinafter, a first embodiment of the present invention will be described with reference to FIGS. 1 to 3. A color arrangement checking device according to the invention includes a document storage unit storing a full-color document in which elements of each color are placed on a page, an attribute detection unit detecting at least a color and a size of the elements for each page of the document, an occupancy ratio calculation unit adding up the size of an element for the whole page by the color and outputting this as an occupancy ratio, a color arrangement checking unit determining whether or not at least one of brightness and saturation exceeds a predetermined color threshold value for each color of the elements, an occupancy ratio checking unit determining whether or not the occupancy ratio for the color of the element, which assumes the color, of which at least one of the brightness and the saturation is determined to exceed the color threshold value, as an attribute, exceeds a predetermined occupancy threshold value, and a result output unit outputting the element which assumes the color, of which the occupancy ratio is determined to exceed the occupancy threshold value, as the attribute.

Figure 1:
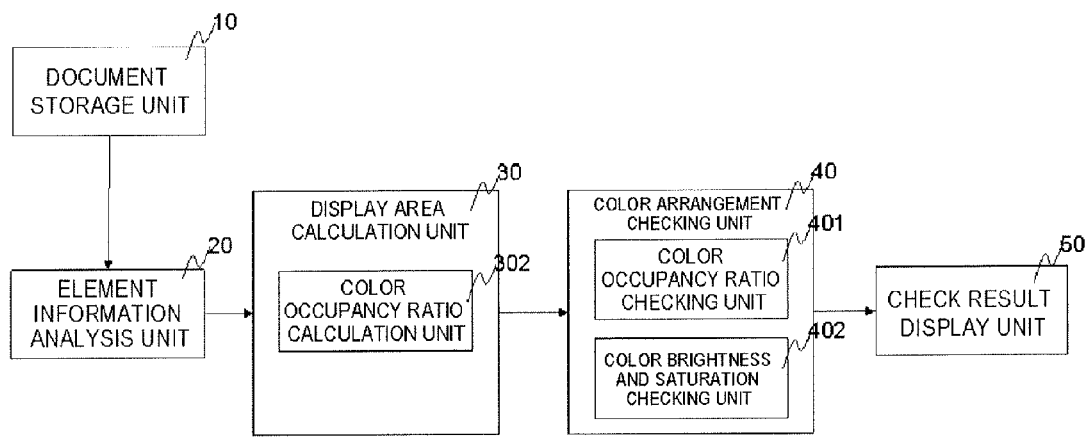
FIG. 1 is a schematic block diagram illustrating a logical structure of a color arrangement checking device according to a first embodiment of the present invention.

More specifically, referring to FIG. 1, the color arrangement checking device according to the first embodiment of the present invention includes a document storage unit 10 storing a full-color document that is displayed on a display screen of a computer device, such as web content or the like, an element information analysis unit 20 analyzing attribute information, such as a color, a type, a position, a size, and the like, of elements of each page (screen) of the document, a display area calculation unit 30, a color arrangement checking unit 40, and a check result display unit 50 displaying the result of the color check.

The display area calculation unit 30 includes a color occupancy ratio calculation unit 302. The color occupancy ratio calculation unit 302 adds up a display area (user visible area) of an element of attribute information of the element output from the element information analysis unit 20 by colors, and calculates and outputs as an occupancy ratio the ratio of the display area added up for colors to the whole screen (page) of the display area added up for colors.

The color arrangement checking unit 40 includes a color occupancy ratio checking unit 401 and a color brightness and saturation checking unit 402. The color brightness and saturation checking unit 402 maintains a color threshold value with respect to the brightness and the saturation, and compares a used color in the page with the color threshold value that maintains the brightness and the saturation to determine which of the brightness and the saturation is in the range of the color threshold value or whether or not both the brightness and the saturation are in the range of the color threshold value.

The color occupancy ratio checking unit 401 compares the occupancy ratio output from the color occupancy ratio calculation unit 302 with the occupancy threshold value with respect to the color for which the color brightness and saturation checking unit 402 has determined that any one or both of the brightness and the saturation exceed the color threshold value, and determines that the color having the occupancy ratio which exceeds the occupancy threshold value is an unfavorable color.

The color arrangement checking device having the above-described structure is realized by installing an appropriate computer program in a computer device. Such a computer program is described, for example, to cause the color arrangement checking device to execute a document storage process of storing a full-color document in which elements of each color are placed on a page, an attribute detection process of detecting at least a color and a size of the elements for each page of the document, an occupancy ratio calculation process of adding up the size of an element for the whole page by the color and outputting this as an occupancy ratio, a color arrangement checking process of determining whether or not at least one of brightness and saturation exceeds a predetermined color threshold value for each color of the elements, an occupancy ratio checking process of determining whether or not the occupancy ratio for the color of the element, which assumes the color, of which at least one of the brightness and the saturation is determined to exceed the color threshold value, as an attribute, exceeds a predetermined occupancy threshold value, and a result output process of outputting the element which assumes the color, of which the occupancy ratio is determined to exceed the occupancy threshold value, as the attribute.

Next, referring to the block diagram of FIG. 1 and the flowcharts of FIGS. 2 and 3, the overall operation according to this embodiment will be described in detail. First, with respect to a document stored in the document storage unit 10, the element information analysis unit 20 analyzes attribute information such as a color, a type, a position, and a size of the element for each page (screen).

Figure 3:
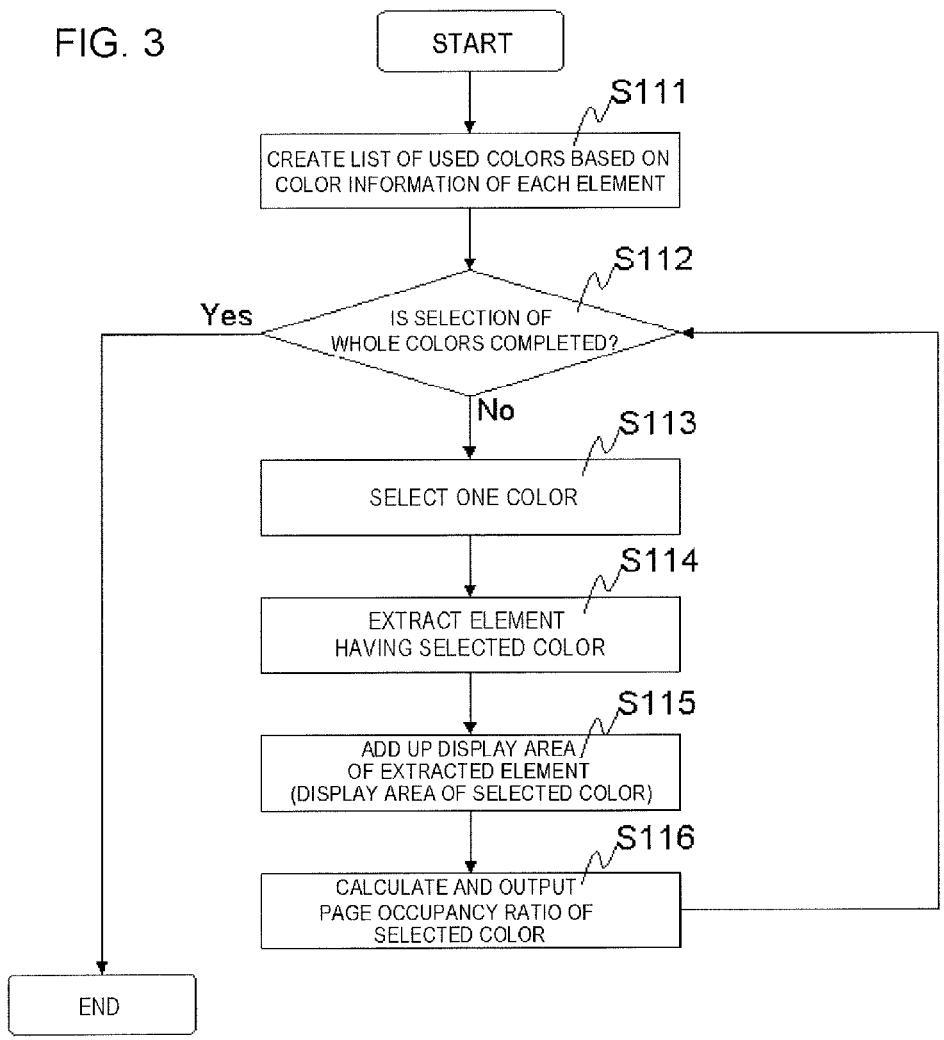
FIG. 3 is a flowchart illustrating a main part of a data processing method of a color arrangement checking device.

The color occupancy ratio calculation unit 302 receives the attribute information of the element, and creates a list of used colors in a page (screen) through extraction of color information from the attribute information (S111 in FIG. 3).

Next, one color that has not yet been selected is selected from the used color list (S112—N to S113 in FIG. 3), an element having the color is extracted from the attribute information (S114 in FIG. 3), and the display area is added up through extraction of information on the display area of the extracted element (S115 in FIG. 3).

The ratio of the display area added up to the area of the overall page (screen) is calculated and output as the page (screen) occupancy ratio of the color (S116 in FIG. 3). The operation in S112 to S116 is repeated until the selection of all colors in the used color list is completed.

In S111 to S116 (in which creation of the used color list, adding up of each color of the display area of the elements, and calculation of the ratio (occupancy ratio) of the display area of each color to the screen (page) are performed), and grouping of color values which are close to each other may be performed.

Figure 2:
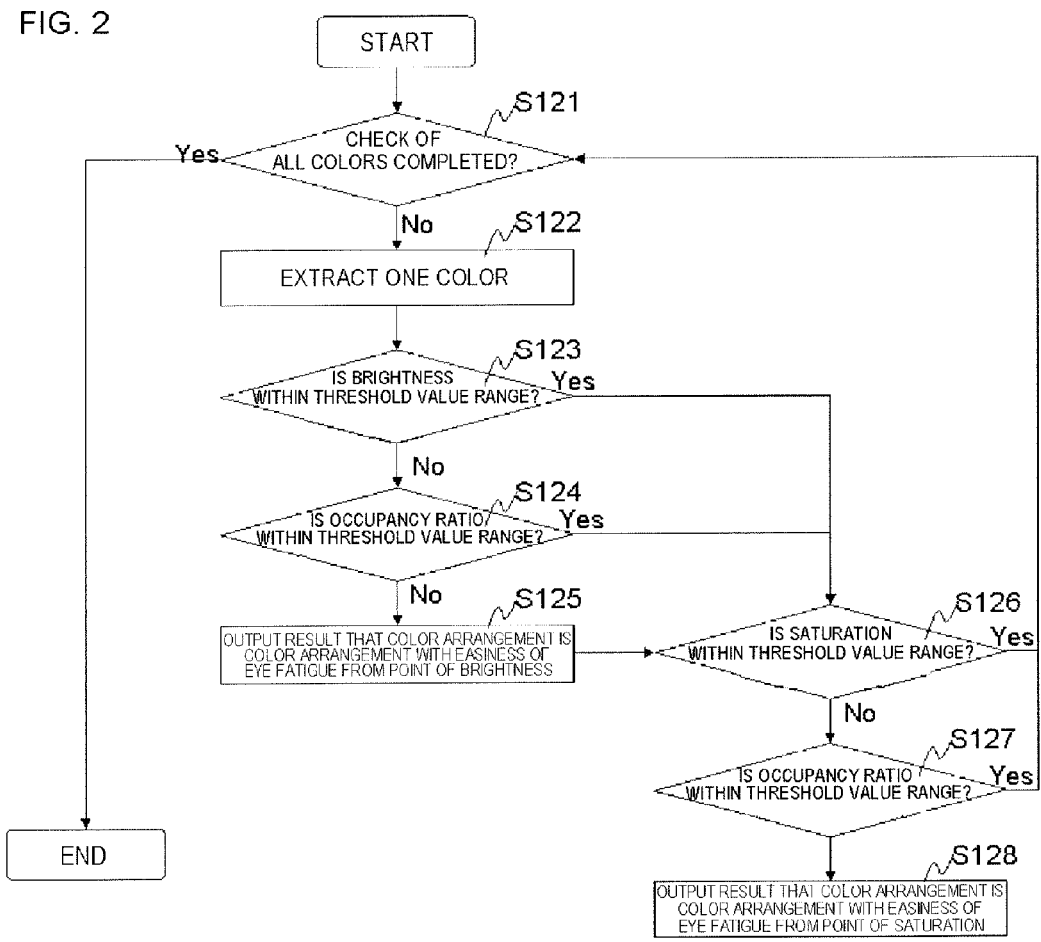
FIG. 2 is a flowchart illustrating a main part of a data processing method of a color arrangement checking device.

Next, the color brightness and saturation checking unit 402 selects a color that has not yet been selected (S121—N to S122 in FIG. 2), and compares the brightness of the selected color with the color threshold value (S123 in FIG. 2). If the brightness is within the range of the color threshold value (S123—Y in FIG. 2), the color brightness and saturation checking unit 402 compares the saturation of the color with the color threshold value being maintained (S126 in FIG. 2).

If the brightness exceeds the color threshold value (S123—N in FIG. 2), the color occupancy ratio checking unit 401 receives the occupancy ratio of the overall screen (page) of an area of each color output from the color occupancy ratio calculation unit 302, and compares the occupancy ratio of the area of the color with the occupancy threshold value (S124 in FIG. 2).

If the occupancy ratio is within the range of the occupancy threshold value (S124—Y in FIG. 2), the saturation of the color is compared with the maintained color threshold value (S126 in FIG. 2). If the occupancy ratio exceeds the occupancy threshold value (S124—N in FIG. 2), the result of the determination that the color is an unfavorable color from a viewpoint of the brightness is output (S125 in FIG. 2), and the result of the saturation of the color is compared with the color threshold value (S126 in FIG. 2).

If the saturation is within the range of the color threshold value (S126—Y in FIG. 2), the next color is extracted and checked (S121 to S122 in FIG. 2). If the saturation exceeds the color threshold value (S126—N in FIG. 2), the color occupancy ratio checking unit 401 receives the occupancy ratio of the overall screen (page) of the area of each color output from the color occupancy ratio calculation unit 302, and compares the occupancy ratio of the area of the color with the maintained occupancy threshold value (S127 in FIG. 2).

If the occupancy ratio is within the range of the occupancy threshold value (S127—Y in FIG. 2), a next color is extracted and checked (S121 to S122 in FIG. 2). If the occupancy ratio exceeds the occupancy threshold value (S127—N of FIG. 2), the result of the determination is that the color is an unfavorable color from a viewpoint of the saturation (S128 in FIG. 2).

The operation of S121 to S128 is repeated until the check of all colors is completed. S123 to S125 (comparison of the brightness of the color with the occupancy threshold value of the occupancy ratio) and S126 to S128 (comparison of the saturation of the color with the occupancy threshold value of the occupancy ratio) may be performed in a reverse order. Lastly, the check result display unit 50 displays the contents of the output of the color arrangement checking unit 40.

According to the color arrangement checking device according to this embodiment, the occupancy ratio of the overall screen (page) of the area of the color that is displayed on the screen (page of the document) is obtained, and the brightness and the saturation of the displayed color are compared with the respective color threshold values being maintained to determine which of the brightness and the saturation is in the range of the color threshold value or whether or not both the brightness and the saturation are in the range of the color threshold value. Further, the output occupancy ratio is compared with the maintained occupancy threshold value with respect to the color for which any one or both of the brightness and the saturation exceed the color threshold value, and the color having the occupancy ratio that exceeds the occupancy threshold value is determined as an unfavorable color.

Through this, with respect to the document that is displayed on the display screen of the computer device such as web content, the problem of the color contributing to cause unfavorable influence such as user fatigue or an unpleasant sensation can be found.

Accordingly, for example, a part for which the user feels fatigue or an unpleasant sensation during creation of the document can be objectively identified, and by correcting the brightness or the saturation of the part, it is possible to create a document for which a user does not feel fatigue or an unpleasant sensation.

Next, a second embodiment of the invention will be described in detail with reference to FIGS. 2 to 6. In the color arrangement checking device according to this embodiment, the attribute detection unit extracts the position of the element for each page of the document.

A superimposition analysis unit is further provided to determine whether or not there are other elements that are superimposed on an upper side of the element based on the position and the size on the page, and the occupancy ratio calculation unit subtracts an area of the element which has been determined to be superimposed and the color of which is set from an area of the element on a lower side to output the occupancy ratio.

Figure 4:
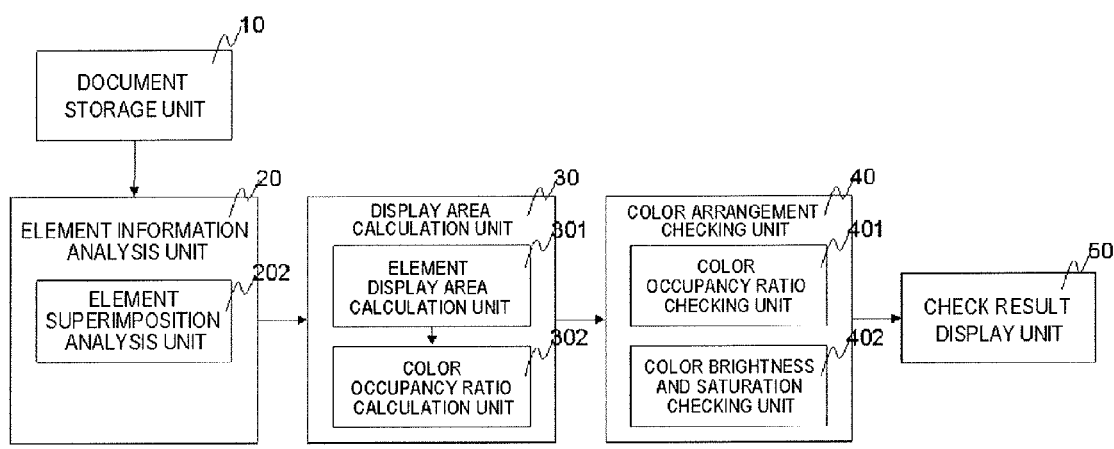
FIG. 4 is a schematic block diagram illustrating a logical structure of a color arrangement checking device according to a second embodiment of the present invention.

More specifically, referring to FIG. 4, the color arrangement checking device according to this embodiment includes a document storage unit 10 storing a document that is displayed on a display screen of a computer device, such as web content or the like, an element information analysis unit 20 analyzing attribute information, such as a color, a type, a position, a size, and the like, of elements of each page (screen) of the document, a display area calculation unit 30, a color arrangement checking unit 40, and a check result display unit 50 displaying the result of the color check.

The element information analysis unit 20 includes an element superimposition analysis unit 202. The element superimposition analysis unit 202 determines whether or not there are other elements that are superimposed on the element based on the position and the size on the page (screen) of the element, and if there are other superimposing elements, the element information analysis unit 20 identifies the other elements positioned right above.

The display area calculation unit 30 includes an element display area calculation unit 301 and a color occupancy ratio calculation unit 302. The element display area calculation unit 301, if there are other elements that are superimposed on the element, based on the information output from the element superimposition analysis unit 202, calculates a display area (user visible area) of the element by subtracting an area of other elements, of which the color is set and the superimposition is closest to the element, among the other elements, from an area of the element.

The color occupancy ratio calculation unit 302 adds up the display area (user visible area) of the element output from the element display area calculation unit 301 by colors, calculates and outputs as an occupancy ratio the ratio of the display area added by colors to the whole screen (page) of the display area added by colors.

The color arrangement checking unit 40 includes a color occupancy ratio checking unit 401 and a color brightness and saturation checking unit 402. The color brightness and saturation checking unit 402 maintains the color threshold value with respect to the brightness and the saturation, and compares the used color in the page with the color threshold value that maintains the brightness and the saturation to determine which of the brightness and the saturation is in the range of the color threshold value or whether or not both the brightness and the saturation are in the range of the color threshold value.

The color occupancy ratio checking unit 401 maintains the occupancy threshold value of the occupancy ratio, compares the occupancy ratio output from the color occupancy ratio calculation unit 302 with the occupancy threshold value with respect to the color for which the color brightness and saturation checking unit 402 has determined that any one or both of the brightness and the saturation exceed the color threshold value, and determines that the color having the occupancy ratio which exceeds the occupancy threshold value is an unfavorable color.

Next, referring to the flowcharts of FIGS. 2, 3, 5, and 6, the overall operation according to this embodiment will be described in detail.

Figure 5:
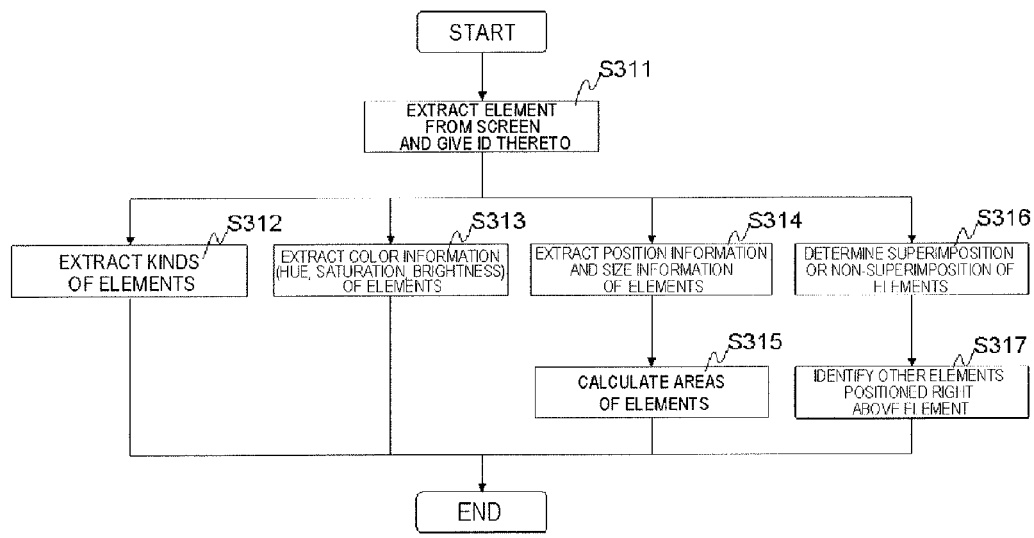
FIG. 5 is a flowchart illustrating a main part of a data processing method of a color arrangement checking device.

First, with respect to the document stored in the document storage unit 10, the element information analysis unit 20 analyzes attribute information, such as a color, a type, a position, and a size of the element for each page (screen) (S311 to S315 in FIG. 5).

Next, the element superimposition analysis unit 202 determines whether or not there are other elements that are superimposed on the element based on the position and the size on the page (screen) of the element (S316 in FIG. 5), and if there are other superimposed elements, the element superimposition analysis unit 202 identifies the other elements positioned right above (S317 in FIG. 5).

Figure 6:
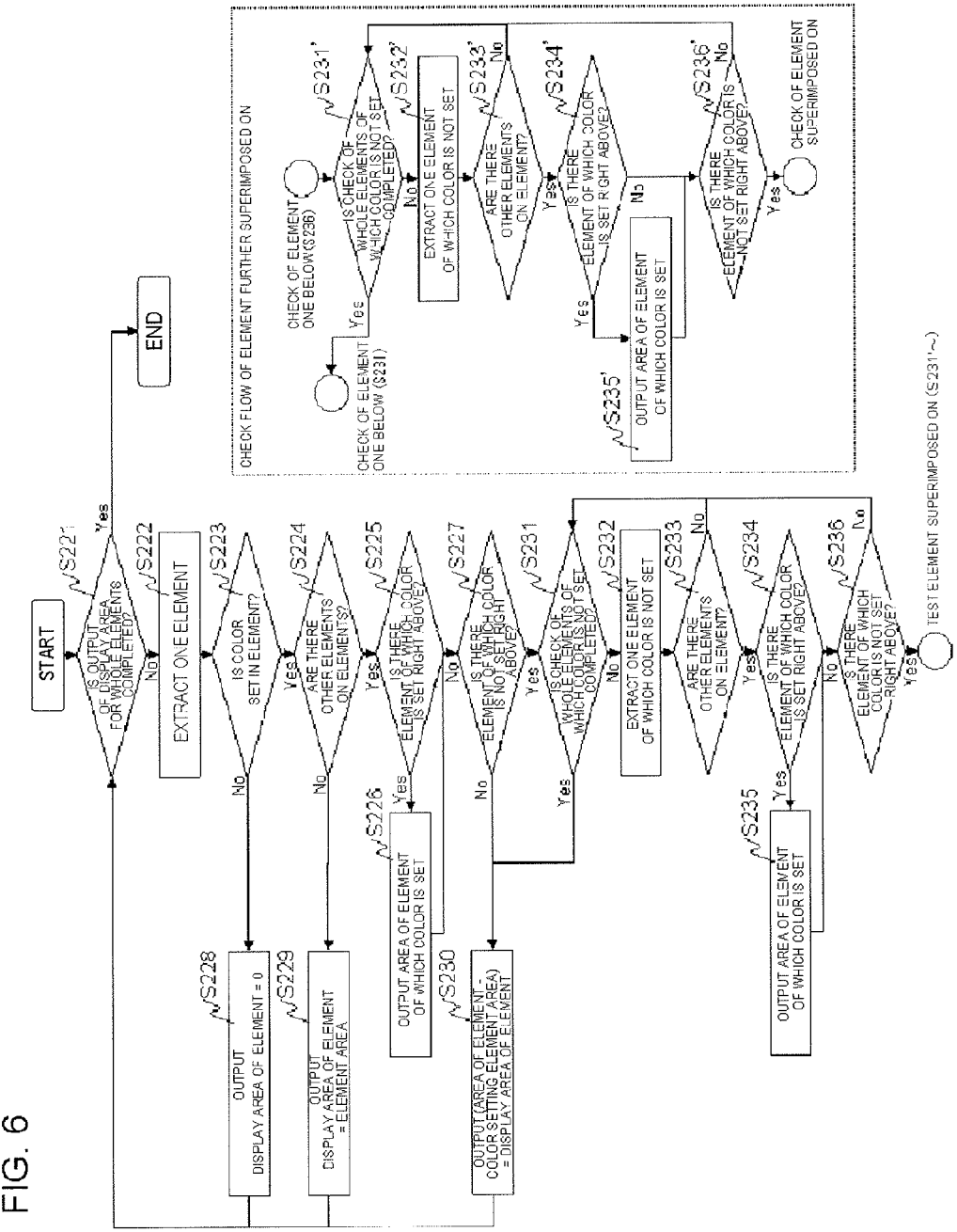
FIG. 6 is a flowchart illustrating a main part of a data processing method of a color arrangement checking device.

Next, the element display area calculation unit 301 selects one element that does not output the display area from elements (S221—N to S222 in FIG. 6), and confirms whether or not a color is set to the element based on the information output from the element information analysis unit 20 (S223 in FIG. 6).

If the color is not set (S223—N in FIG. 6), the element display area calculation unit 301 outputs the display area (user visible area) of the element as "0" (S228 in FIG. 6), returns to S221, and calculates the display area of the element.

If the color is set to the element (S223—Y in FIG. 6), it is confirmed whether or not there are other elements that are superimposed on the element based on the information output from the element superimposition analysis unit 202 (S224 of FIG. 6).

If there is not another superimposed element (S224—N in FIG. 6), the area of the element is output as the display area (user visible area) (S229 in FIG. 6), the processing returns to S221, and the display area of the element is calculated.

If there is another superimposed element (S224—Y in FIG. 6), it is confirmed whether or not there is an element of which the color is set in other elements that are closest (right above the element) to the superimposition of the element (S225 in FIG. 6). If there is an element of which the color is set (S225—Y in FIG. 6), such an area is output as another element area that hides the element (S226 in FIG. 6).

If there is not an element of which the color is set (S225—N in FIG. 6), and if another element area that hides the element is output (S226 of FIG. 6), it is confirmed whether or not there is an element of which the color is not set in other elements right above the element (S227 in FIG. 6).

If there is not an element of which the color is not set (S227—N in FIG. 6), the area obtained by subtracting the area output in S226 from the area of the element is output as the display area (user visible area) (S230 in FIG. 6), the processing returns to S221, and the display area of the element is calculated.

If there is an element of which the color is not set in other elements right above the element (S227—Y in FIG. 6), one element that is not checked is selected from other elements of which the color is not set (S231—N to S232 in FIG. 6), and it is confirmed whether or not there are other elements that are superimposed on the element of which the color is not set based on the information output from the element superimposition analysis unit 202 (S233 in FIG. 6). If there are not other elements that are superimposed on the element of which the color is not set (S233—N in FIG. 6), the processing returns to S231, and the element of which the color is not set is checked.

If there are other elements that are superimposed on the element of which the color is not set (S233—Y in FIG. 6), it is confirmed whether or not there is an element of which the color is set in other elements that is closest (right above the element of which the color is not set) to the superimposition of the element of which the color is not set (S234 in FIG. 6). If there is an element of which the color is set (S234—Y in FIG. 6), such an area is output as another element area that hides the element (S235 in FIG. 6).

If there is not an element of which the color is set (S234—N in FIG. 6), and if another element area that hides the element is output (S235 of FIG. 6), it is confirmed whether or not there is an element of which the color is not set in other elements right above the element of which the color is not set (S236 in FIG. 6). If there is not the element of which the color is not set (S236—N in FIG. 6), the processing returns to S231 to check the element of which the color is not set.

If there is an element of which the color is not set in other elements right above the element of which the color is not set, one element that is not checked is selected from other elements of which the color is not set, and the check of S231 to S236 is performed until the element of which the color is not set disappears right above the element to be checked (S231' to S236' in FIG. 6).

If the check of all the elements of which the color is not set is completed, the area that is obtained by subtracting the area output in S226 and the area output in S235 and S235' from the area of the element is output as the display area (user visible area) (S230 in FIG. 6), the processing returns to S221, and the display area of the element is calculated. The operation in S221 to S236 is repeated until the display area is output with respect to all the elements.

The color occupancy ratio calculation unit 302 receives the attribute information of the element and information of the display area for each element that is output from the element display area calculation unit 301, and extracts color information from the attribute information to create a list of used colors in a page (screen) (S111 in FIG. 3).

Next, one color that has not yet been selected is selected from the used color list (S112—N to S113 in FIG. 3), an element having the color is extracted from the attribute information (S114 in FIG. 3), and the display area is added up through extraction of the display area of the extracted element from the display area information for each element (S115 in FIG. 3).

The ratio of the display area added up to the area of the overall page (screen) is calculated and output as the page (screen) occupancy ratio of the color (S116 in FIG. 3). The operation in S112 to S116 is repeated until the selection of all colors in the used color list is completed.

In S111 to S116 (in which creation of the used color list, adding up of each color of the display area of the element, and calculation of the ratio (occupancy ratio) of the display area of each color to the screen (page) are performed), grouping of color values which are close to each other may be performed.

Next, the color brightness and saturation checking unit 402 selects the color that has not yet been selected (S121—N to S122 in FIG. 2), and compares the brightness of the selected color with the color threshold value (S123 in FIG. 2). If the brightness is within the range of the color threshold value, the color brightness and saturation checking unit 402 compares the saturation of the color with the color threshold value being maintained (S126 in FIG. 2).

If the brightness exceeds the color threshold value, the color occupancy ratio checking unit 401 receives the occupancy ratio of the overall screen (page) of an area of each color output from the color occupancy ratio calculation unit 302, and compares the occupancy ratio of the area of the color with the occupancy threshold value (S124 in FIG. 2).

If the occupancy ratio is within the range of the occupancy threshold value, the saturation of the color is compared with the maintained color threshold value (S126 in FIG. 2). If the occupancy ratio exceeds the occupancy threshold value, the result of the determination that the color is an unfavorable color from a viewpoint of the brightness is output (S125 in FIG. 2), and the result the saturation of the color is compared with the color threshold value (S126 in FIG. 2).

If the saturation is within the range of the color threshold value, the next color is extracted and checked (S121 to S122 in FIG. 2). If the saturation exceeds the color threshold value, the color occupancy ratio checking unit 401 receives the occupancy ratio of the overall screen (page) of the area of each color output from the color occupancy ratio calculation unit 302, and compares the occupancy ratio of the area of the color with the maintained occupancy threshold value (S127 in FIG. 2).

If the occupancy ratio is within the range of the occupancy threshold value, a next color is extracted and checked (S121 to S122 in FIG. 2). If the occupancy ratio exceeds the occupancy threshold value, the result of the determination that the color is an unfavorable color from a viewpoint of the saturation (S128 in FIG. 2).

The operation of S121 to S128 is repeated until the check of all colors is completed. S123 to S125 (comparison of the brightness of the color with the occupancy threshold value of the occupancy ratio) and S126 to S128 (comparison of the saturation of the color with the occupancy threshold value of the occupancy ratio) may be performed in a reverse order. Last, the check result display unit 50 displays the contents of the output of the color arrangement checking unit 40.

Next, the effect of this embodiment will be described. The color arrangement checking device according to this embodiment, in addition to the configuration of the color arrangement checking device according to the first embodiment, includes an element superimposition analysis unit 202 which determines whether or not there is other elements that are superimposed on the element based on the position and the size on the page (screen) of the element, and identifies other elements positioned right above if there are the other superimposing elements, and an element display area calculation unit 301 which, if there are other elements that are superimposed on the element, based on the information output from the element superimposition analysis unit 202, calculates a display area (user visible area) of the element by subtracting an area of other elements, of which the color is set and the superimposition is closest to the element, among the other elements of which the color is set, from an area of the element.

Because of this, even in the case where the elements that constitute the page (screen) of the document overlap each other and there is a difference between the area of the element itself and the user visible area, the user visible area can be calculated.

Through this, the problem of the color to contribute to cause the unfavorable influence such as user fatigue or an unpleasant sensation can be found more accurately. Accordingly, for example, a part that the user feels fatigue or an unpleasant sensation during creation of the document can be objectively identified, and by correcting the brightness or the saturation of the part, it is possible to create a document which the user does not feel fatigue or an unpleasant sensation.

Next, a third embodiment of the invention will be described in detail with reference to the drawings. In the color arrangement checking device according to this embodiment, the result output unit outputs the element together with a plurality of attribute information items containing at least the color and the size.

Figure 7:
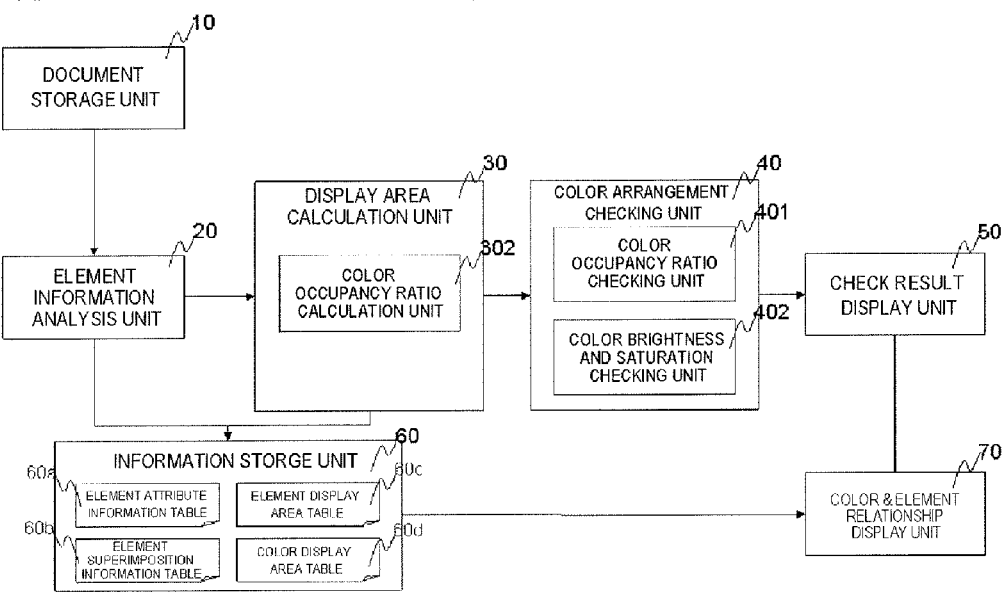
FIG. 7 is a schematic block diagram illustrating a logical structure of a color arrangement checking device according to a third embodiment of the present invention.

More specifically, referring to FIG. 7, the color arrangement checking device according to the third embodiment of the invention includes an information storage unit 60 and a color & element relationship display unit 70 in addition to some configurations according to the first and second embodiments.

The information storage unit 60 records and maintains attribution information for each element, a display area for each color, and an occupancy ratio, which are output from the element information analysis unit 20, and a display area calculation unit 303. The color & element relationship display unit 70 extracts the element of which the color is set with reference to the information stored in the information storage unit 60 with respect to the unfavorable color output from the color arrangement checking unit 40, and displays the relationship between the color and the element so that a user knows it.

According to this embodiment, in the color arrangement checking device according to any one of the first embodiment and the second embodiment, the attribution information for each element and the display area and the occupancy ratio for each color are output from the element information analysis unit 20 and the display area calculation unit 303.

Such information is sent to a unit that performs the next operation and is stored in the information storage unit 60 in the same manner as the process in the color texting device according to any one of the first embodiment and the second embodiment.

The color occupancy ratio checking unit 401 and the color brightness and saturation checking unit 402 perform the same processes as the color arrangement checking apparatus according to any one of the first embodiment and the second embodiment. Thereafter, if the result of determination in that a specified color that is used on a page (screen) is an unfavorable color is output from the color arrangement checking unit 40, this result is displayed on the display unit 50, and the color & element relationship display unit 70 extracts the element of which the color is set with reference to the information stored in the information storage unit 60, and displays the relationship between the color and the element so that a user knows it.

According to this embodiment, in addition to the configuration of the color texting device according to the first embodiment and the second embodiment, the information storage unit 60 and the color & element relationship display unit 70 are provided to specify the user which element constituting the page (screen) of the document is the element having the color with respect to the color that is determined as the unfavorable color. Through this, the user can promptly specify the element of which the color should be corrected in the page (screen) and connect it to the correction work.

Next, a fourth embodiment of the invention will be described in detail with reference to the drawings. In the color arrangement checking device according to this embodiment, a color changing unit that changes at least one of the color, brightness, and saturation output from the result output unit is further provided.

Figure 8:
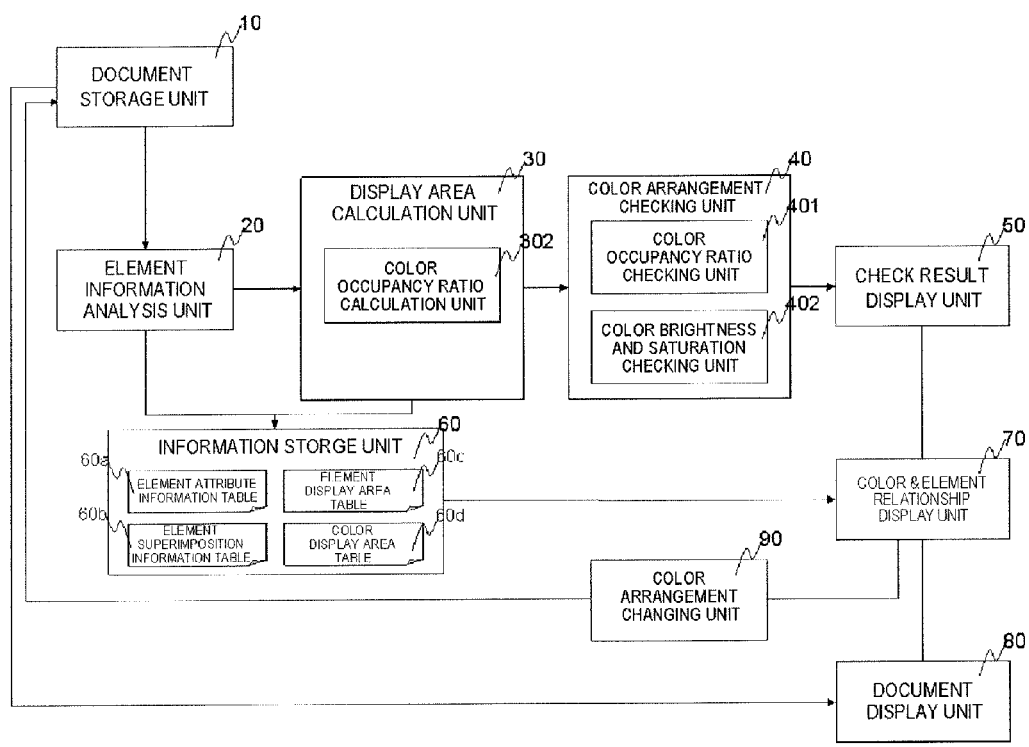
FIG. 8 is a schematic block diagram illustrating a logical structure of a color arrangement checking device according to a fourth embodiment of the present invention.

More specifically, referring to FIG. 8, the color arrangement checking device according to the fourth embodiment of the invention includes a color changing unit 90 for changing the color of the page (screen) of the document to be checked and a document display unit 80 displaying the document to be checked that is stored in the document storage unit 10 in addition to the configuration of the color arrangement checking device according to the third embodiment.

In this embodiment, if the user inputs a changed color to the color changing unit 90 through designation of the color or the element with reference to the determination result presented by the check result display unit 50, the color that is determined as the unfavorable color and is presented by the color & element relationship display unit 70, and the information of the element of which the color is set, after performing the same process as the third embodiment, the color changing unit 90 changes the color of the document to be checked that is stored in the document storage unit 10 according to a user's input.

The color changing unit 90 instructs the element information analysis unit 20 to analyze the element attribute, after the color change, to perform the following superimposition analysis of the element, calculation of the display area, calculation of the color occupancy ratio, and the color check. Thereafter, the recheck result by the change of the color is redisplayed on the check result display unit 50, and the relationship between the color based on the recheck result and the element having the color is redisplayed on the color & element relationship display unit 70. The document display unit 80 displays the latest document of which the color has been changed with reference to the document storage unit 10.

According to this embodiment, in addition to the configuration of the color texting device according to the third embodiment, the color changing unit 90 that can change the color of the page (screen) of the document to be checked and the document display unit 80 that enables a direct confirmation of the change result of the color on the screen (page) are provided.

Through this, it is possible to immediately confirm the result of the change on the screen (page) through an instantaneous change of the color with reference to the result of the color check. Accordingly, it is possible for the user to perform the work of correcting the color of the page (screen) of the document more smoothly based on the color check.

EXAMPLE

Next, the operation in the best form to carry out the invention using concrete embodiments will be described. In an example of a screen illustrated in FIG. 9, the operation of the color check according to the invention will be described, for example, with respect to "easiness of eye fatigue"

Figure 9:
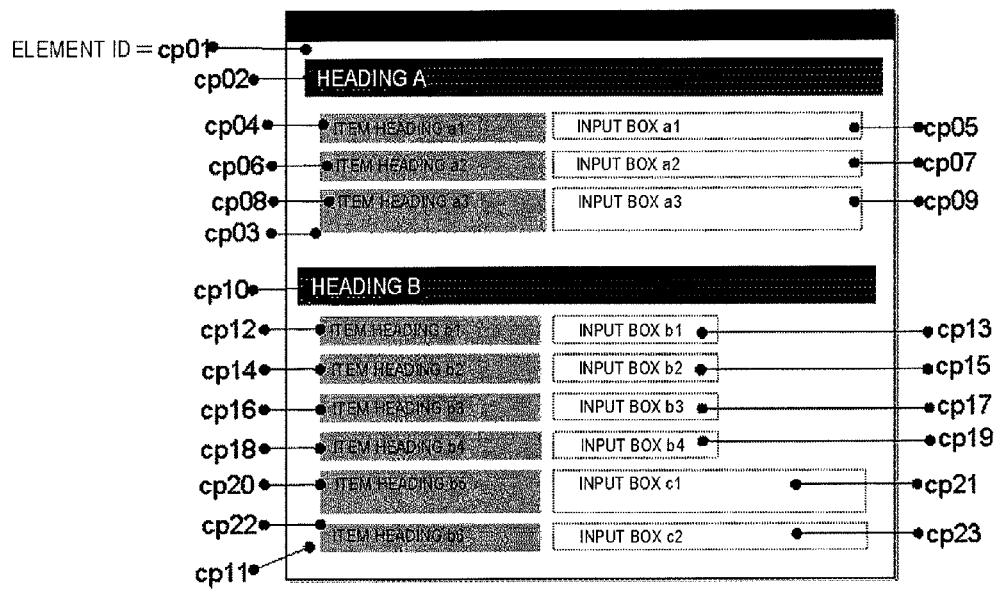
FIG. 9 is a schematic front view illustrating a display screen of a document according to an example of the present invention.

First, with respect to the screen (document) illustrated in FIG. 9, which is stored in the document storage unit 10, the element information analysis unit 20 analyzes attribution information, such as a background color, a type, a position, and a size of the elements of the page (screen) (S311 to S315 in FIG. 5), and outputs a list of attribute information for each element (FIG. 10).

The element superimposition analysis unit 202 determines whether or not there are other elements that are superimposed on the element based on the position and the size on the page (screen) of the element (S316 in FIG. 5), and if there are other superimposing elements, the element information analysis unit 202 identifies other elements positioned right above (S317 in FIG. 5) to output the identified element (FIG. 11).

For example, in the case of the element CP01 of FIG. 9, in a position (top0, left0) of the element as shown in FIG. 10, the element CP01 has a size (height770, width870), and other elements are all positioned on the lower right side than CP01, and from (height<=770, width<=870), it is determined that there is an element that is superimposed on CP01.

Since CP11 that has a big size next to CP01 is positioned on the upper left side than CP10 and CP12 to 23 (height: high, width: wide), and CP03 that is third largest is positioned on the upper left side than CP02 and CP04 to CP09 (height: high, width: wide), the elements that are superimposed right above CP01 can be identified as CP11 and CP03, and CP01 shown in FIG. 11 is output along with superimposing element: existence (1), and elements right above: CP03 and CP11.

Next, the operation of the element display area calculation will be described as an example of a screen of FIG. 9. The element display area calculation unit 301 first selects CP01 as one element that does not output the display area among the elements (S221 to S222 in FIG. 6).

Next, based on the information of the background color (H, S, V)=(0, 0, 100) of CP01 output from the element information analysis unit 20 (FIG. 10), it is confirmed whether or not a background color is set in the element (S223 in FIG. 6).

Since the background color is set in CP01, it is confirmed whether or not there are other elements that are superimposed on the element based on the information (FIG. 11) output from the element superimposition analysis unit 202 (S224 in FIG. 6).

Since there are other superimposing elements in CP01, it is confirmed in FIG. 10 whether or not there is an element of which the color is set in other elements CP03 and CP11 that are closest (right above the element) to the superimposition of the element (S225 in FIG. 6).

Since the color is set in both CP03 and CP11, the areas CP03: 221400 and CP11: 319800 are extracted referring to FIG. 10, and are output as other element areas that hide the element CP01 (S226 in FIG. 6).

Since there is not an element of which the color is not set right above the element CP01 (S227—N in FIG. 6), the areas CP03: 221400 and CP11: 319800 output in S226 are subtracted from the area (669900) of the element CP01.

As a result, 128700 is output to be in CP01 in FIG. 12 as the display area (user visible area) (S230 in FIG. 6). Thereafter, the processing returns to S221 in FIG. 6, and the display area of the next element CP02 is calculated.

With respect to CP02, it is confirmed whether or not the background color is set (S223 in FIG. 6) in the element based on the information of the background color (H, S, V)=(150, 100, 40) of CP02 output from the element information analysis unit 20 (FIG. 10).

Since the background color is set in CP02, it is confirmed (S224 in FIG. 6) whether or not there are other elements superimposed on the element based on the information (FIG. 11) output from the element superimposition analysis unit 202.

Since there are not other superimposing elements in CP02, the area (41000) of CP02 in FIG. 10 is output to be in CP02 in FIG. 12 as the display area (user visible area) (S229 in FIG. 6). The processing returns to S221, and the display area of the next element is calculated. The operation of S221 to S236 in FIG. 6 is repeated until the display area is output with respect to all the elements.

Next, the operation of the color occupancy ratio calculation will be described as an example of the screen in FIG. 9. The color occupancy ratio calculation unit 302 receives the attribute information (FIG. 10) of the element and information (FIG. 12) of the display area for each element output by the element display area calculation unit 301, and creates a list of used colors in the page (screen) as shown in FIG. 13 through extraction of background color information from the attribute information (S111 in FIG. 3).

Next, as one color that has not yet been selected from the background color list, (H, S, V)=(0, 0, 100) is selected (S112 to S113 in FIG. 3), and as elements having the color, 10 elements of CP01, CP05, CP07, CP09, CP13, CP15, CP17, CP19, CP21, and CP23 are extracted from the attribute information in FIG. 10 (S114 in FIG. 3).

Next, 271900 is output as the display area by extracting and adding up the display area of the elements extracted from the display area information for each element of FIG. 12 (S115 in FIG. 3). Further, the ratio of the calculated display area 271900 to the area of the whole page (screen) 669900 is calculated.

As a result, 41% is output to be in (H, S, V)=(0, 0, 100) in FIG. 14 as the occupancy ratio of the page (screen) of the area of the color (S116 in FIG. 3). The operation of S112 to S116 is repeated until the selection of all the colors in the background color list is completed.

Next, the operation of the color check will be described as an example of the screen of FIG. 9. The color brightness and saturation text unit 402 selects (H, S, V)=(0, 0, 100) as one color that has not yet been selected (S121 to S122 in FIG. 2), and compares the selected color with the color threshold value (for example, "brightness V is equal to or lower than 80" that maintains the brightness (V=100) of the color (S123 in FIG. 2).

Since the brightness of the color (H, S, V)=(0, 0, 100) exceeds the color threshold value, the color occupancy ratio checking unit 401 extracts the occupancy 41% of the area of the color output from the color occupancy ratio calculation unit 302 to the whole screen (page) from FIG. 14, and compares the extracted occupancy ratio with the occupancy threshold value (for example, "the occupancy ratio is set to equal to or less than 30%") that maintains the occupancy ratio of the area of the color (S124 in FIG. 2).

Since the occupancy ratio 41% of the area of the color (H, S, V)=(0, 0, 100) exceeds the occupancy threshold value (equal to or less than 30%), the color arrangement checking unit 40 outputs the result of the determination "the color (H, S, V)=(0, 0, 100) is a color with easiness of eye fatigue from a viewpoint of the brightness" (S125 in FIG. 2).

The color brightness and saturation checking unit 402 compares the saturation (S=0) of the color (H, S, V)=(0, 0, 100) with the maintained color threshold value (for example, "the saturation S is set to equal to or less than 80") (S126 in FIG. 2).

Since the saturation of the color (H, S, V)=(0, 0, 100) is within the range of the color threshold value, the next color (H, S, V)=(105, 80, 100) extracted and checked (S121 to S122 in FIG. 2).

Next, the extracted color (H, S, V)=(105, 80, 100) is compared with the color threshold value (for example, "the brightness V is set to equal to or less than 80") that maintains the brightness (V=100) of the color (S123 in FIG. 2).

Since the brightness of the color (H, S, V)=(105, 80, 100) exceeds the color threshold value, the color occupancy ratio checking unit 401 extracts the occupancy 19% of the area of the color output from the color occupancy ratio calculation unit 302 to the whole screen (page) from FIG. 14, and compares the extracted occupancy ratio with the occupancy threshold value (for example, "the occupancy ratio is set to equal to or less than 30%") that maintains the occupancy ratio of the area of the color (S124 in FIG. 2).

Since the occupancy ratio (19%) of the area of the color (H, S, V)=(105, 80, 100) is within the occupancy threshold value (30% or less), this occupancy ratio is compared with the color threshold value (for example, "the saturation S is set to 80 or less") that maintains the saturation (S=80) of the color (S126 in FIG. 2).

Since the saturation of the color (H, S, V)=(105, 80, 100) exceeds the color threshold value, the color occupancy ratio checking unit 401 extracts the occupancy 19% of the area of the color output from the color occupancy ratio calculation unit 302 to the whole screen (page) from FIG. 14, and compares the extracted occupancy ratio with the occupancy threshold value (for example, "the occupancy ratio is set to 15% or less") that maintains the occupancy ratio of the area of the color (S127 in FIG. 2).

Since the occupancy ratio 19% of the area of the color (H, S, V)=(105, 80, 100) exceeds the occupancy threshold value (15% or less), the color arrangement checking unit 40 outputs the result of the determination "the color (H, S, V)=(105, 80, 100) is a color with easiness of eye fatigue from a viewpoint of the saturation" (S128 in FIG. 2). The operation of S121 to S128 in FIG. 2 is repeated until the check of all the colors is completed.

Last, the check result display unit 50 receives the output from the color arrangement checking unit 40, and displays "the color (H, S, V)=(0, 0, 100) is a color with easiness of eye fatigue from a viewpoint of the brightness" and "the color (H, S, V)=(105, 80, 100) is a color with easiness of eye fatigue from a viewpoint of the saturation" with respect to the color that is determined as the color with easiness of eye fatigue.

The present invention is not limited to this embodiment, and various modifications are permitted within a range that does not deviate from the gist of the invention. For example, in the above embodiment, it is exemplified that the document is electronic data that is output to and displayed on the display screen of the computer device. However, the embodiment may also be applied to the document that is printed with full color.

In the embodiment, it is exemplified that the respective units of the data processing device is logically realized as various functions by a computer program. However, the respective units may be formed by their own hardware or may be realized by a combination of software and hardware.

The color information described according to the invention may be expressed by hue, brightness, and saturation. In the case where the colors of the elements are set in RGB (Red, Green, and Blue) type, the conversion of the color into the "hue, brightness, and saturation" may be performed during the extraction of the color information.

Of course, the above-described embodiments and the plurality of modified examples may be combined within the range in which the contents do not disagree. Although the structures of the respective units have been described in detail in the above-described embodiments and the modified example, the structures may be variously changed in the range that satisfies the present invention.

This application is based on Japanese Patent Application No. 2010-115923 filed on May 20, 2010, the disclosure of which is incorporated herein by reference in its entirety.

What is claimed is:

1. A color arrangement checking device comprising:
a document storage storing a full-color document in which elements of each color are placed on a page;
at least one processor which implements:
an attribute detection unit detecting at least a color and a size of the elements for each page of the document;
an occupancy ratio calculation unit adding up the size of the elements for the whole page by the color and outputting this as an occupancy ratio;
a color arrangement checking unit determining whether or not at least one of brightness and saturation exceeds a predetermined color threshold value for each color of the elements; and
an occupancy ratio checking unit determining whether or not the occupancy ratio by the color of the elements, which assume the color, of which at least one of the brightness and the saturation is determined to exceed the color threshold value, as an attribute, exceeds a predetermined occupancy threshold value; and
a result output display outputting the elements which assume the color, of which the occupancy ratio is determined to exceed the occupancy threshold value, as the attribute,
wherein the predetermined occupancy threshold value of the color of which the brightness is determined to exceed the color threshold value is different from that of the color of which the saturation is determined to exceed the color threshold value.

2. The color arrangement checking device according to claim 1, wherein the attribute detection unit detects positions of the elements for each page of the document,
wherein the at least one processor further implements a superimposition analysis unit determining whether or not there is another element superimposed on an upper side of an element based on the position and size of the page, and
wherein the occupancy ratio calculation unit subtracts an area of the element on an upper side which has been determined to be superimposed and the color of which is set from an area of the element on a lower side to output the occupancy ratio.

3. The color arrangement checking device according to claim 1, wherein the result output display outputs the elements together with a plurality of attribute information items including at least the color and the size.

4. The color arrangement checking device according to claim 1, wherein the at least one processor further implements a color changing unit changing at least one of hue, the brightness, and the saturation of the elements output from the result output display.

5. A non-transitory information storage medium storing a computer program for causing the color arrangement checking device according to claim 1 to execute:
a document storage process of storing a full-color document in which elements of each color are placed on a page;
an attribute detection process of detecting at least a color and a size of the elements for each page of the document;
an occupancy ratio calculation process of adding up the size of an element for the whole page by the color and outputting this as an occupancy ratio;
a color arrangement checking process of determining whether or not at least one of brightness and saturation exceeds a predetermined color threshold value for each color of the elements;
an occupancy ratio checking process of determining whether or not the occupancy ratio by the color of the elements, which assume the color, of which at least one of the brightness and the saturation is determined to exceed the color threshold value, as an attribute, exceeds a predetermined occupancy threshold value; and
a result output process of outputting the elements which assume the color, of which the occupancy ratio is determined to exceed the occupancy threshold value, as the attribute,
wherein the predetermined occupancy threshold value of the color of which the brightness is determined to exceed the color threshold value is different from that of the color of which the saturation is determined to exceed the color threshold value.

6. A data processing method of the color arrangement checking device according to claim 1, comprising:
a document storage operation of storing a full-color document in which elements of each color are placed on a page;
an attribute detection operation of detecting at least a color and a size of the elements for each page of the document;
an occupancy ratio calculation operation of adding up the size of the elements for the whole page by the color and outputting this as an occupancy ratio;
a color arrangement checking operation of determining whether or not at least one of brightness and saturation exceeds a predetermined color threshold value for each color of the elements;
an occupancy ratio checking operation of determining whether or not the occupancy ratio by the color of the elements, which assume the color, of which at least one of the brightness and the saturation is determined to exceed the color threshold value, as an attribute, exceeds a predetermined occupancy threshold value; and
a result output operation of outputting the elements which assume the color, of which the occupancy ratio is determined to exceed the occupancy threshold value, as the attribute,
wherein the predetermined occupancy threshold value of the color of which the brightness is determined to exceed the color threshold value is different from that of the color of which the saturation is determined to exceed the color threshold value.

* * * * *